United States Patent
Kainuma et al.

(10) Patent No.: US 9,388,719 B2
(45) Date of Patent: Jul. 12, 2016

(54) MUFFLER

(71) Applicant: FUTABA INDUSTRIAL CO., LTD., Okazaki-shi, Aichi (JP)

(72) Inventors: Katsuhiko Kainuma, Okazaki (JP); Masahiro Kajikawa, Okazaki (JP)

(73) Assignee: FUTABA INDUSTRIAL CO., LTD., Okazaki-shi (JP)

( * ) Notice: Subject to any disclaimer, the term of this patent is extended or adjusted under 35 U.S.C. 154(b) by 0 days.

(21) Appl. No.: 14/406,169

(22) PCT Filed: Jun. 7, 2013

(86) PCT No.: PCT/JP2013/065870
§ 371 (c)(1),
(2) Date: Dec. 5, 2014

(87) PCT Pub. No.: WO2013/183772
PCT Pub. Date: Dec. 12, 2013

(65) Prior Publication Data
US 2015/0152760 A1    Jun. 4, 2015

(30) Foreign Application Priority Data

Jun. 7, 2012    (JP) .................................. 2012-130056

(51) Int. Cl.
*F01N 1/24* (2006.01)
*F01N 1/08* (2006.01)
(Continued)

(52) U.S. Cl.
CPC . *F01N 1/24* (2013.01); *B60K 13/04* (2013.01); *F01N 1/083* (2013.01); *F01N 1/084* (2013.01); *F01N 1/161* (2013.01); *F01N 1/166* (2013.01)

(58) Field of Classification Search
CPC ......... F01N 1/161; F01N 1/163; F01N 1/165; F01N 1/166

USPC .................................................. 181/226, 254
See application file for complete search history.

(56) References Cited

U.S. PATENT DOCUMENTS 2,488,563 A * 11/1949 Sills ........................ F01N 3/08
                                                      123/198 R
5,452,578 A * 9/1995 Barber .................. F01N 13/087
                                                      181/236

(Continued)

FOREIGN PATENT DOCUMENTS

JP    H0281911 A        3/1990
JP    06088515 A  *    3/1994

(Continued)

OTHER PUBLICATIONS

Office Action (Notice of Reason(s) for Rejection) in Japanese Patent Application No. 2014-520073 dated Aug. 4, 2015.

(Continued)

*Primary Examiner* — Jeremy Luks
(74) *Attorney, Agent, or Firm* — Withrow & Terranova, P.L.L.C.; Vincent K. Gustafson

(57) ABSTRACT

Provided is a muffler comprising: an outer shell; an outlet pipe, which is formed into a tubular shape containing a pair of open end-parts and is comprising an inlet port, wherein one of the open end-parts and the inlet port are arranged inside the outer shell; a valve body formed into a plate-like shape to cover the inlet port from the inside of the outlet pipe; an axis member that pivotally supports the valve body to the outlet pipe so that the valve body pivots inside the outlet pipe; and a biasing member that applies a biasing force in the radial direction of the outlet pipe to the valve body so as to occlude the inlet port.

17 Claims, 11 Drawing Sheets

(51) Int. Cl.
*F01N 1/16* (2006.01)
*B60K 13/04* (2006.01)

(56) References Cited

U.S. PATENT DOCUMENTS

| | | | |
|---|---|---|---|
| 5,709,241 | A | 1/1998 | Iwata |
| 2012/0055734 | A1 | 3/2012 | Miike et al. |

FOREIGN PATENT DOCUMENTS

| | | | |
|---|---|---|---|
| JP | H08189328 | A | 7/1996 |
| JP | H10184349 | A | 7/1998 |
| JP | 2005264900 | A | 9/2005 |
| JP | 2007192205 | A | 8/2007 |
| JP | 4156785 | B2 | 9/2008 |
| JP | 2011208565 | A | 10/2011 |
| JP | 2012057482 | A | 3/2012 |

OTHER PUBLICATIONS

International Search Report for International Patent Application No. PCT/JP2013/065870 mailed Jul. 16, 2013, 2 pages.

International Preliminary Report on Patentability for International Patent Application No. PCT/JP2013/065870 completed on Sep. 8, 2014, 5 pages.

Notification of the First Office Action for Chinese Patent Application No. 201380029939.4, dated Apr. 5, 2016, 13 pages.

* cited by examiner

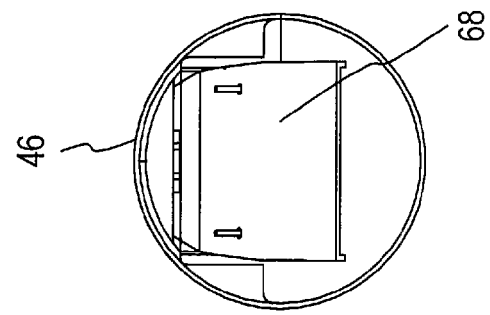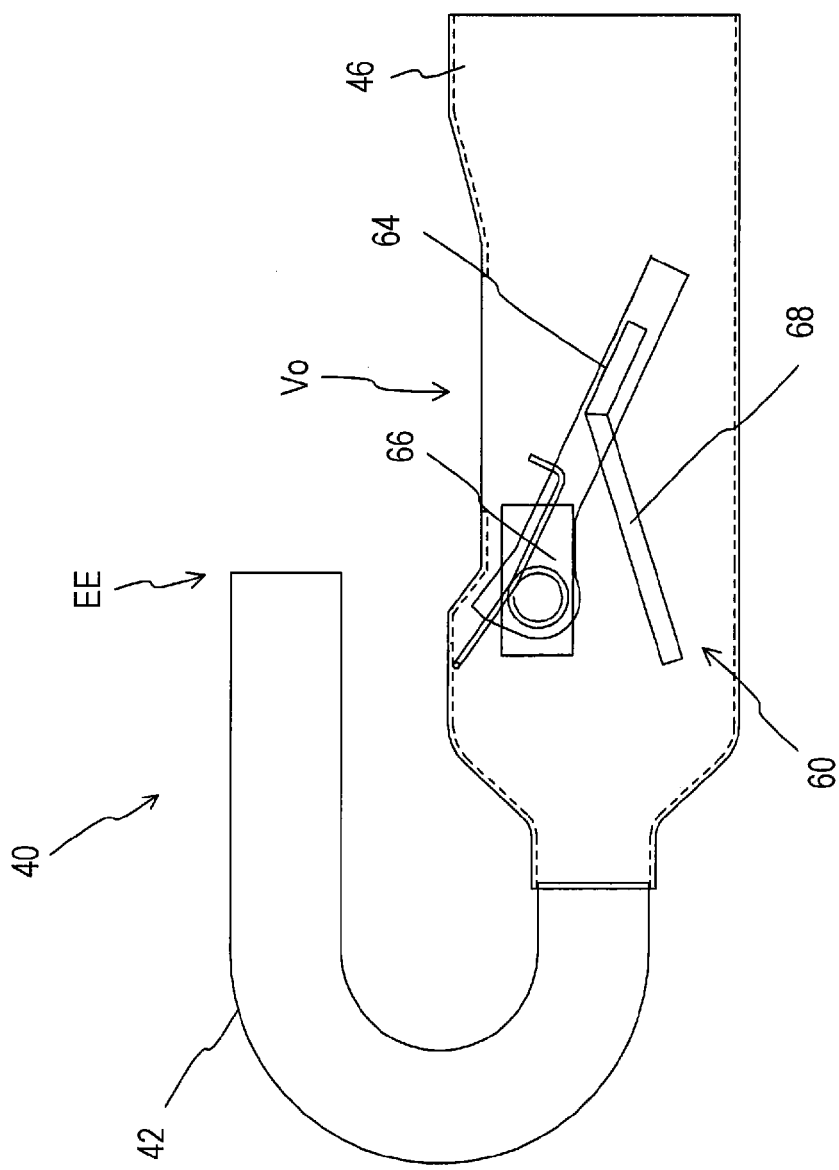

MUFFLER

CROSS-REFERENCE TO RELATED APPLICATIONS

This application is a 35 U.S.C. §371 national phase of International Patent Application No. PCT/JP2013/065870 filed Jun. 7, 2013, which claims the benefit of Japanese Patent Application No. 2012-130056 filed Jun. 7, 2012 in the Japan Patent Office, and the entire disclosures of the foregoing International and Japanese patent applications are hereby incorporated by reference herein.

TECHNICAL FIELD

The present invention relates to a muffler.

BACKGROUND ART

A muffler provided with an outer shell, an inlet pipe, an outlet pipe, and a valve is conventionally known; the inlet pipe lets exhaust gases flow from an internal combustion engine into the outer shell; the outlet pipe discharges the exhaust gases in the outer shell to the outside; and the valve changes a flow path of the exhaust gases inside the outer shell according to an operation status of the internal combustion engine (see Patent Document 1).

The outlet pipe described in Patent Document 1 is formed into a tubular shape including multiple through holes on an outer surface thereof as well as containing a pair of open end-parts; one open end-part and the through holes are arranged to be placed inside the outer shell. An opening of the outlet pipe arranged inside the outer shell is hereinafter referred to as an exhaust-gas inlet port.

The valve is provided with a valve body, an axis member to pivotally support the valve body, and a biasing member to apply a biasing force to the valve body; wherein the valve is closed by occluding the exhaust-gas inlet port with the valve body by the biasing force, if the operation status of the internal combustion engine is in low rotation, and the valve is opened by releasing the valve body from the exhaust-gas inlet port, if the operation status of the internal combustion engine is in high rotation.

In other words, the exhaust gases from the internal combustion engine flow into the outlet pipe from the through holes, if the operation status of the internal combustion engine is in low rotation; and flow into the outlet pipe from the exhaust-gas inlet port, if the operation status of the internal combustion engine is in high rotation.

It is favorable to form a general exhaust-gas inlet port with a diameter equal to or larger than that of the outlet pipe to smoothly discharge the exhaust gases, the amount of flow of which is increased because of a high rotational frequency of the internal combustion engine, to the outside. In order to dispose a valve to an exhaust-gas inlet port in such size, a muffler described in Patent Document 1 is configured to dispose a tubular diameter-expansion part with a diameter larger than that of the exhaust-gas inlet port (i.e., diameter of the outlet pipe) to an end part of the outlet pipe, and then to fix an axis member of the valve to that diameter-expansion part.

PRIOR ART DOCUMENTS

Patent Documents

Patent Document 1: Japanese Patent No. 4156785

SUMMARY OF THE INVENTION

Problems to be Solved by the Invention

In a muffler described in Patent Document 1, it is required to dispose a diameter-expansion part to an outlet pipe to dispose a valve as described above; therefore, there is a problem of increase in size of an outlet pipe structure and consequently of a muffler structure.

Further, there is a problem that the diameter-expansion part of the outlet pipe must be disposed to an end part of the outlet pipe because of the structure of the outlet pipe, and thus a place for disposing the valve is limited as well.

In other words, the muffler described in Patent Document 1 has many structural restrictions and has a low flexibility in designing.

Thus, in one aspect of the present invention, it is favorable to reduce the structural restrictions of the muffler.

Means for Solving the Problems

One aspect of the present invention is related to a muffler provided with an outer shell, an outlet pipe, a valve body, an axis member, and a biasing member.

In the muffler according to one aspect of the present invention, exhaust gases from an internal combustion engine are exhausted into the outer shell. The outlet pipe is formed into a tubular shape including a pair of open end-parts, and contains an inlet port that is an opening passing through an outer surface and an inner surface; additionally, one of the open end-parts and the inlet port are arranged inside the outer shell to discharge the exhaust gases from the outer shell to the outside.

The valve body according to one aspect of the present invention is formed into a plate-like shape to cover the inlet port from the inside of the outlet pipe. The axis member pivotally supports the valve body to the outlet pipe so that the valve body pivots inside the outlet pipe. The biasing member applies a biasing force in the radial direction of the outlet pipe to the valve body so as to occlude the inlet port.

A valve configured with the valve body, the axis member, and the biasing member as described above is closed by the biasing force from the biasing member, if the internal combustion engine rotates in a low frequency and a flow amount of the exhaust gases is small. However, if the internal combustion engine rotates in a high frequency and the flow amount of the exhaust gases increases to raise a pressure inside the outer shell, a force larger than the biasing force from the biasing member is applied to the valve body to drive the valve body towards the inside of the outlet pipe and the valve is consequently opened. The exhaust gases thereby flow into the outlet pipe from the inlet port and are discharged to the outside.

In the muffler as described above, the inlet port and the valve can be disposed to positions along the axial direction of the outlet pipe, without being limited to the open end-parts of the outlet pipe. As a result, it is possible to freely select positions to dispose the inlet port and the valve according to one aspect of the present invention.

Furthermore, according to one aspect of the present invention, it is not required to dispose a diameter-expansion part to the outlet pipe as a position to dispose the valve; therefore, it is possible to prevent an increase in size of the outlet pipe structure and consequently of the muffler structure.

As described hereinbefore, it is possible to reduce structural restrictions of the muffler according to one aspect of the present invention.

The axis member according to one aspect of the present invention may pivotally support the valve body at an end part of the inlet port at the upstream side of a flow path of the exhaust gases in the outlet pipe.

In the muffler as described above, the valve body moves further away from an inner surface of the outlet pipe at the downstream side of the flow path of the exhaust gases, when the above-mentioned valve is opened. Thus, resistance of the valve body against the exhaust gases that flows into the outlet pipe becomes small when the valve is opened, allowing the exhaust gases to circulate smoothly, in the muffler according to one aspect of the present invention.

Further, in the muffler according to one aspect of the present invention, a resisting part connected to the valve body may be provided to increase a force to close the valve by the exhaust gases that flow from one of the pair of the open end-parts into the outlet pipe and circulate therein.

A valve provided with such resisting part helps apply a force to close the valve to the valve body; thus the force required to open the valve, namely, a back pressure required to open the valve can be increased. Consequently, the valve can remain closed not only when the operation status of the internal combustion engine is in low rotation, but over a wide range of rotational frequency, and the flow path of the exhaust gases in the outlet pipe can be elongated according to one aspect of the present invention. Additionally, an amount of noise reduction in low-frequency range can be increased according to one aspect of the present invention.

The above resisting part may be extended from the valve body towards the upstream direction of the flow path of the exhaust gases inside the outlet pipe so as to resist the exhaust gases that circulate inside the outlet pipe.

The resisting part according to one aspect of the present invention can be configured by extending from the valve body towards the upstream direction of the flow path of the exhaust gases inside the outlet pipe so as to resist the exhaust gases that circulate inside the outlet pipe.

In one aspect of the present invention, the valve body may be supported by an axis member at the end part of the inlet port at the upstream side of the flow path of the exhaust gases in the outlet pipe. The resisting part in this case may be extended from a position at more upstream side of the flow path of the exhaust gases in the outlet pipe compared to a position where the valve body is supported by the axis member.

Since such resisting part exerts a larger resisting force against the exhaust gases that circulate inside the outlet pipe, the valve can remain closed over a wider range of rotational frequency.

Further in one aspect of the present invention, a muffler may be provided with an extension extended from an end part of a resisting part that is not connected to the valve body towards the upstream side of the flow path of the exhaust gases in the outlet pipe, so as to reduce the flow path of the exhaust gases in the outlet pipe.

Such muffler can reduce the flow path of the exhaust gases in the outlet pipe, and enable the resisting part to exert a larger force against the exhaust gases that circulate inside the outlet pipe When an end part, connected to the resisting part, of the extension is referred to as a valve body connecting-end, and an end part opposite the valve body connecting-end of the extension is referred to as a non-connecting end; the extension may be extended so that the non-connecting end is disposed closer to the axis member than the valve body connecting-end is in the radial direction of the outlet pipe.

Such muffler can secure the flow path of the exhaust gases between the internal combustion engine and the outlet pipe; enabling the exhaust gases to flow out of the automobile more definitely, even if the back pressure is low.

The resisting part according to one aspect of the present invention may be integrally formed with the valve body. A process to assemble a resisting part to a valve body can be eliminated by using such resisting part, and efficiency of performance can be improved.

In the muffler according to one aspect of the present invention, the shape of the inlet port may be with an opening width that increases along the flow path of the exhaust gases in the outlet pipe.

Such muffler can have an enlarged opening area when the valve is opened, and enables a smooth circulation of the exhaust gases.

Additionally, in the muffler according to one aspect of the present invention, the outlet pipe may be provided with two concaves on two spots thereon facing each other across the axial direction of the outlet pipe; the concaves are formed by denting the outer surface of the outlet pipe inward. End parts of the axis member disposed inside the outlet pipe may be supported at the two concaves in this case.

The valve with the above structure can prevent component members of the valve from protruding beyond the outside diameter of the outlet pipe and can minimize increase in size of the outlet pipe structure (and thus of the muffler structure) more definitely.

Further in the muffler according to one aspect of the present invention, a small-diameter pipe may be provided; the small-diameter pipe has a diameter smaller than that of the outlet pipe and contains a pair of open end-parts, wherein one of the pair of the open end-parts is connected to the outlet pipe at more upstream side of the flow path in the outlet pipe compared to the inlet port.

Such muffler can elongate the flow path for the exhaust gases to flow outside the muffler when the valve is closed.

In addition, the outer shell according to one aspect of the present invention may be provided with a partition wall to form multiple spaces to let the exhaust gases from the internal combustion engine flow in. In this case, among the pair of its open end-parts, the small-diameter pipe may have the other open end-part, which is not connected to the outlet pipe, located inside the outer shell in a space different from a space where the inlet port is located.

With such muffler, the flow path of the exhaust gases from the inside of the outer shell to the inside of the outlet pipe can be varied depending on the rotational status of the internal combustion engine.

The outlet pipe according to one aspect of the present invention can have a round shape radial cross-section with respect to the axial direction of the outlet pipe.

The muffler according to one aspect of the present invention may further be provided with an inlet pipe to let the exhaust gases from the internal combustion engine flow inside the outer shell.

The biasing member according to one aspect of the present invention may be a double torsion spring.

With such muffler, it is possible to minimize a large biasing force being applied to one area of the valve body and consequently equalize the biasing force applied to each area of the valve body.

BRIEF DESCRIPTION OF THE DRAWINGS

FIG. 5A is a front view and FIG. 5B is a side view illustrating when the valve disposed to the pipe main body is opened according to First Embodiment.

EXPLANATION OF REFERENCE NUMERALS

1 . . . muffler, 10 . . . inlet pipe, 20 . . . outer shell, 22 . . . tubular part, 28,30 . . . partition wall, 40 . . . outlet pipe, 42 . . . small-diameter pipe, 46 . . . pipe main body, 56,58 . . . concave, 60 . . . valve, 62 . . . valve body, 68 . . . resisting part, 70 . . . axis member, 72 . . . biasing member, 100 . . . internal combustion engine, Vo . . . inlet port

MODE FOR CARRYING OUT THE INVENTION

Embodiments of the present invention are described hereinafter with reference to the drawings.

[First Embodiment]
<Configuration of Muffler>

Figure 1:
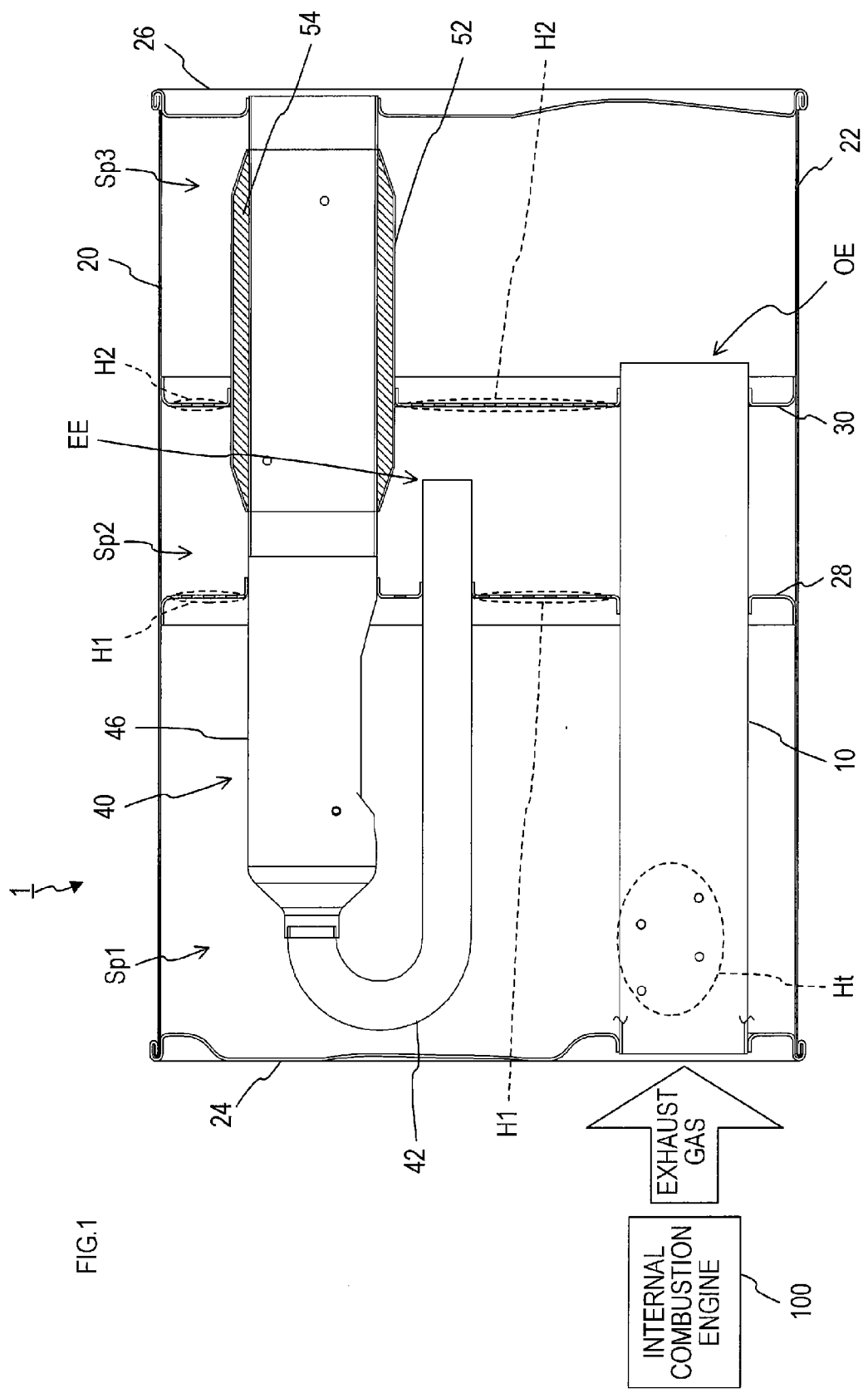
FIG. 1 is an approximate cross-sectional view of a muffler according to First Embodiment.

A muffler 1 illustrated in FIG. 1 configures an exhaust-gas system to discharge exhaust gases from an internal combustion engine 100 installed in an automobile to the outside of the automobile.

Figure 3:
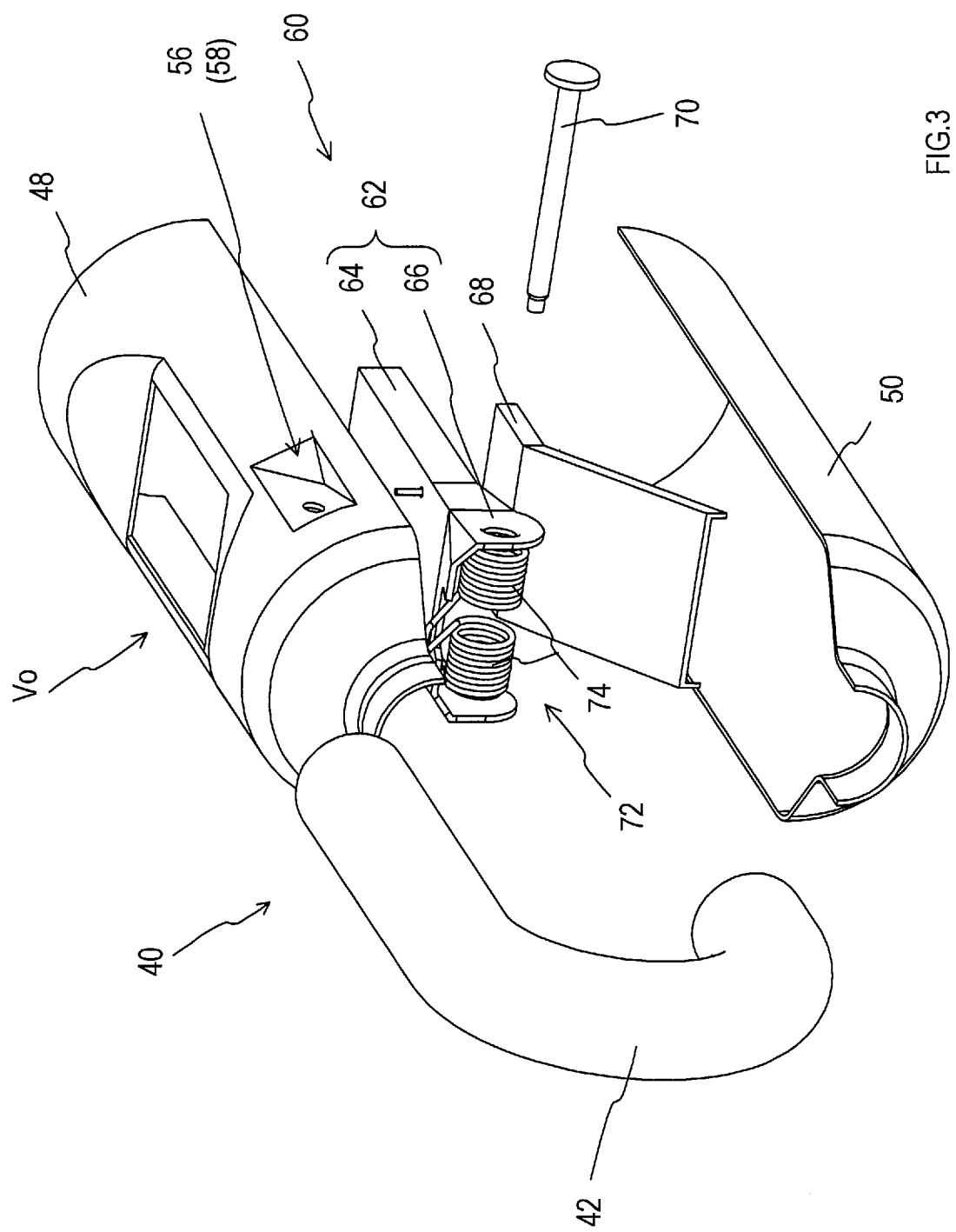
FIG. 3 is an exploded view illustrating an inside structure of the part of the outlet pipe according to First Embodiment

This muffler 1 is provided with an inlet pipe 10, an outer shell 20, an outlet pipe 40, and a valve 60 (see FIG. 3).

The inlet pipe 10 is a member that lets the exhaust gases from the internal combustion engine 100 flow inside the outer shell 20. The inlet pipe 10 is formed into a tubular shape including a pair of open end-parts. One open end-part (hereinafter referred to as inlet end) of the inlet pipe 10 is connected to a pipe through which the exhaust gases from the internal combustion engine 100 flow.

The inlet pipe 10 according to this embodiment is provided with multiple through holes Ht that pass through an outer surface and an inner surface.

The outer shell 20 is provided with a cylindrical tubular part 22 and sidewall parts 24 and 26 that occlude both ends of the tubular part 22, and is formed to have a hollow section thereinside. Two partition walls 28 and 30 are disposed inside the hollow section of the outer shell 20 to divide the hollow section into three spaces.

Hereinafter, the space defined by the tubular part 22, sidewall part 24, and partition wall 28 is referred to as a first expansion chamber Sp1; the space defined by the tubular part 22, partition wall 28, and partition wall 30 is referred to as a second expansion chamber Sp2; and the space defined by the tubular part 22, partition wall 30, and sidewall part 26 is referred to as a third expansion chamber Sp3.

The end part (hereinafter referred to as outlet end) OE opposite the inlet end of the inlet pipe 10 is disposed inside the outer shell 20 so as to let the exhaust gases from the internal combustion engine 100 flow inside the outer shell 20. In this embodiment, the outlet end OE of the inlet pipe 10 is inserted from the sidewall part 24 of the outer shell 20 to be disposed inside the third expansion chamber Sp3 through the first expansion chamber Sp1, partition wall 28, second expansion chamber Sp2, and partition wall 30.

The through holes Ht of the inlet pipe 10 are disposed to be located in the first expansion chamber Sp1 of the outer shell 20 according to this embodiment.

Additionally, two partition walls 28 and 30 are provided with multiple holes H1 and H2 passing therethrough respectively according to this embodiment. In other words, the outer shell 20 is configured so as to enable gas (the exhaust gases) circulation between the first expansion chamber Sp1, second expansion chamber Sp2, and third expansion chamber Sp3.

The outlet pipe 40 is a member to discharge the exhaust gases, which flows inside the outer shell 20 from the internal combustion engine 100, to the outside of the automobile; and is a member formed into a cylindrical shape including a pair of open end-parts as a whole. One of the pair of open end-parts of this outlet pipe 40 is disposed inside the outer shell 20 so as to let the exhaust gases flow inside the outlet pipe 40. This pair of open end-parts of the outlet pipe 40 disposed inside the outer shell 20 is hereinafter referred to as exhaust-gas inlet ends EE.

Figure 2:
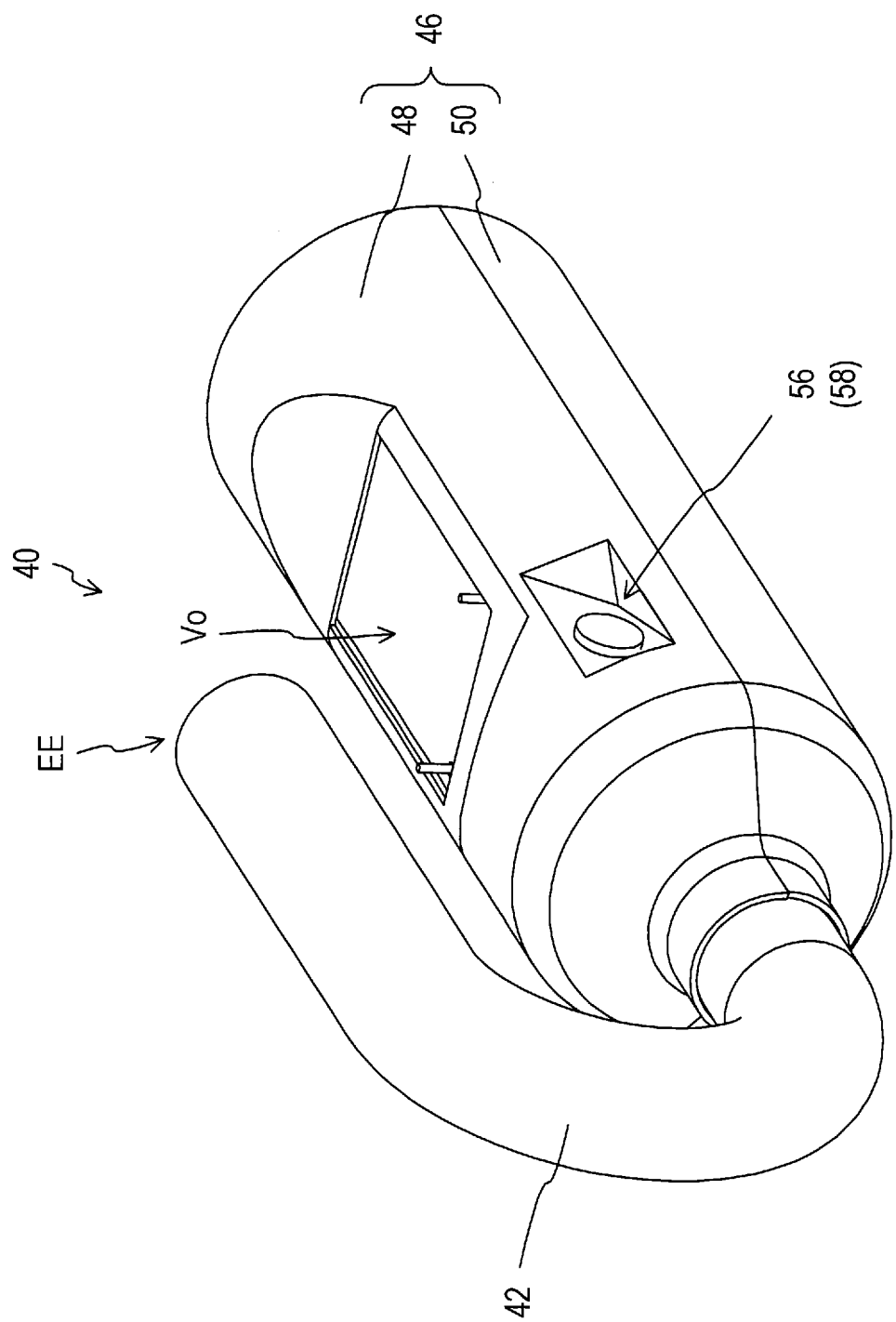
FIG. 2 is a perspective view of a part of an outlet pipe according to First Embodiment.

As illustrated in FIG. 2, the outlet pipe 40 is provided with a small-diameter pipe 42 and a pipe main body 46.

The small-diameter pipe 42 is a member including a pair of open end-parts and is formed into a cylindrical shape. This small-diameter pipe 42 is formed into a U-shaped curve around an area including one end thereof; the remaining area of the small-diameter pipe 42 is formed into a straight-line.

The end part of the small-diameter pipe 42 at the area formed into a straight-line is disposed in the second expansion chamber Sp2 of the outer shell 20 so as to function as the exhaust-gas inlet end EE. The end part of the small-diameter pipe 42 at the area formed into a curve (hereinafter referred to as main body connecting-end) is connected to the pipe main body 46 in the first expansion chamber Sp1 of the outer shell 20.

The pipe main body 46 is a member formed into a cylindrical shape including a pair of open end-parts as a whole, and is provided with a first main body part 48 and a second main body part 50.

These first main body part 48 and second main body part 50 are semicircular-shape members, resembling a cylindrical pipe being cut along an axis that passes through its central line; and thus by connecting the first main body part 48 and the second main body part 50 at the cut surfaces thereof, they function as a cylindrically-shaped member.

The main body connecting-end of the small-diameter pipe 42 is connected to one end (hereinafter referred to as small-diameter connecting-end) of a pair of open end-parts of the pipe main body 46, which is configured with the first main body part 48 and the second main body part 50. Among the pair of open end-parts of the pipe main body 46, an end part, which is not the small-diameter connecting-end, is disposed outside the outer shell 20 (thus, outside the automobile) through the partition wall 28, second expansion chamber Sp2, partition wall 30, third expansion chamber Sp3, and sidewall part 26, so as to discharge the exhaust gases in the outer shell 20 to the outside.

Additionally, the pipe main body 46 includes an opening (hereinafter referred to as inlet port) Vo that passes through the outer surface and the inner surface thereof. The inlet port Vo according to this embodiment is provided on a plane surface, which is formed on the first main body part 48 by denting. An opening area of the inlet port Vo is formed larger than an opening area of the small-diameter connecting-end of the pipe main body 46 (or an opening area of the pipe main body 46). The inlet port Vo of the pipe main body 46 is located in the first expansion chamber Sp1 of the outer shell 20 according to this embodiment.

The pipe main body 46 is further provided with two concaves, 56 and 58, formed by denting the outer surface of the pipe main body 46 inward. The concaves 56 and 58 according to this embodiment are formed on spots that face each other across the axial direction of the pipe main body 46, and are located on the pipe main body 46 at more upstream side of the flow path of the exhaust gases in the outlet pipe 40 compared to the inlet port Vo. Since the location of the concave 58 cannot be illustrated in FIG. 2, reference numeral of the concave 58 is omitted; the numeral "58" is added to the reference numeral of the concave 56 as a substitute.

The outlet pipe 40 is provided with a noise absorption part 52 (see FIG. 1) that absorbs exhaust noise. The noise absorption part 52 according to this embodiment is configured with a noise absorption material 54 (for example, glass wool or steel wool) (see FIG. 1) disposed to a tubular area of the noise absorption part 52 between the outer surface of the pipe main body 46; wherein the diameter of the tubular area is formed larger than that of the pipe main body 46.

<Configuration of Valve>

Next is an explanation of the valve 60.

The valve 60 is provided with a valve body 62, a resisting part 68, an axis member 70, and a biasing member 72 as illustrated in FIG. 3.

Among the above, the axis member 70 is a central shaft member on (around) which the valve body 62 pivots in the valve 60. The shaft length of this axis member 70 is approximately the same as the distance between the two concaves, 56 and 58, on the pipe main body 46.

The valve body 62 is provided with a valve main body 64 and a holding part 66; the valve main body 64 is in a plate-like shape and covers the inlet port Vo from inside the pipe main body 46, the holding part 66 contains holes through which the axis member 70 is inserted. This valve body 62 is provided with a resisting part 68 connected to the valve body 62 so as to increase a force to close the valve by the exhaust gases that flow from the main body connecting-end into the pipe main body 46 and circulate therein. This resisting part 68 is a plate-like member and is fixed to the valve main body 64 so as to protrude towards the upstream side of the flow path of the exhaust gases inside the pipe main body 46.

The biasing member 72 is a coil spring to apply a biasing force to the valve body 62; a known double torsion spring, for example. This biasing member 72 is disposed inside the pipe main body 46 as the axis member 70 is inserted through a coil 74 of the biasing member 72, so as to generate the biasing force in the radial direction of the pipe main body 46 against the valve body 62 to occlude the inlet port Vo.

In other words, the valve body 62 is pivotally supported in the valve 60 because the axis member 70, which is inserted through the holes formed on the holding part 66 of the valve body 62 and the coil 74 of the biasing member 72, is supported at the concaves 56 and 58 formed on the pipe main body 46. The valve 60 is closed as the biasing member 72 applies the biasing force, which is from the inside to the outside of the pipe main body 46 in the radial direction, to this pivotally supported valve body 62. When the valve 60 is closed, the inlet port Vo formed on the pipe main body 46 is occluded by the valve main body 64 from inside the pipe main body 46.

However, if a force applied to the valve body 62 is at least larger than the biasing force applied to the valve body 62 by the biasing member 72 and is towards inside the pipe main body 46 in the radial direction of the pipe main body 46, the valve 60 opens. Since the valve main body 64 is pivotally supported at more upstream side of the flow path of the exhaust gases compared to the inlet port Vo, the valve main body 64 moves further away from the inner surface of the outlet pipe 40 and the opening of the valve 60 at the inlet port Vo becomes larger at the downstream side of the flow path of the exhaust gases.

<Function of Muffler>

Next is an explanation of functions of the muffler.

The exhaust gases from the internal combustion engine 100 circulate in the inlet pipe 10 and flow inside the outer shell 20 from the through holes Ht and an opening at the outlet end OE of the inlet pipe 10. If the rotational frequency (number of rotations per unit time) of the internal combustion engine 100 is low, the flow amount of exhaust gases from the internal combustion engine 100 is small and thereby an increase of the back pressure (i.e., pressure inside the first expansion chamber Sp1) is small in the outer shell 20.

Figure 4A:
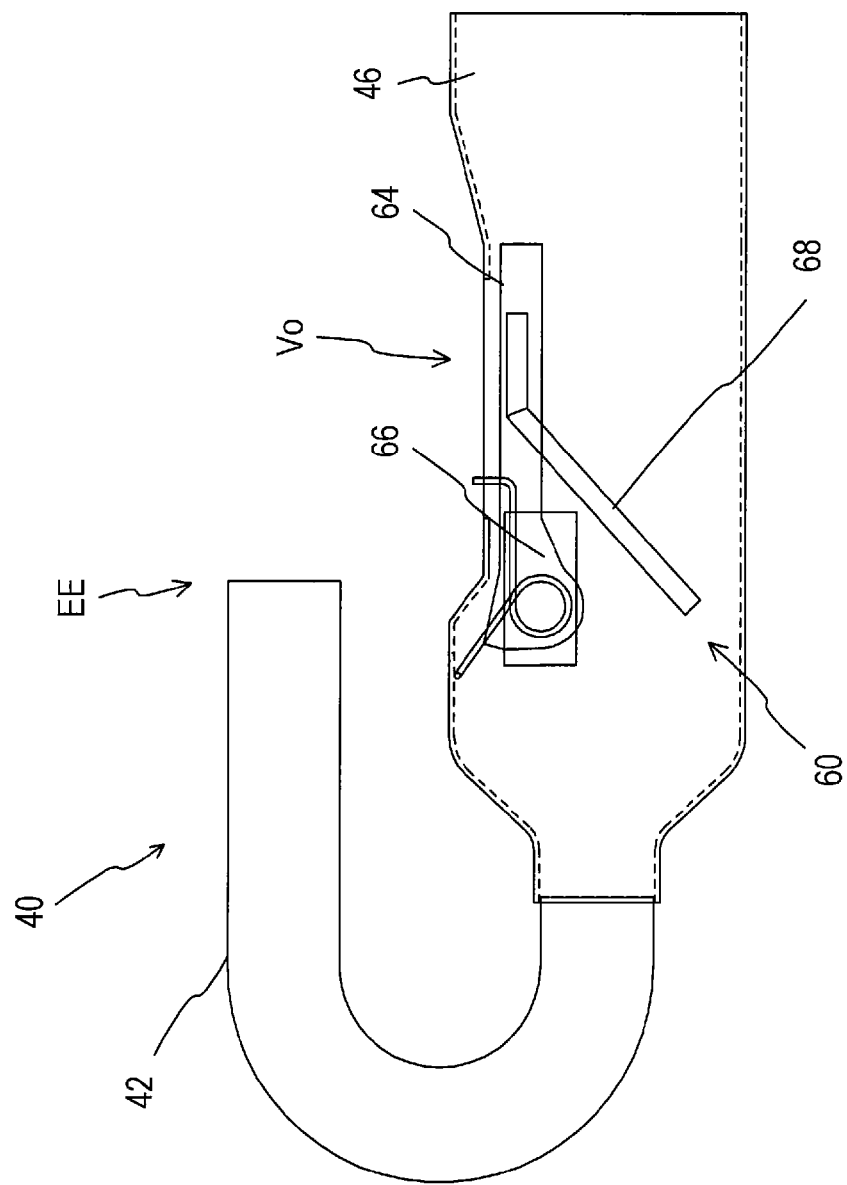
FIG. 4A is a front view and FIG. 4B is a side view illustrating when a valve disposed to a pipe main body is closed according to First Embodiment.
Figure 4B:
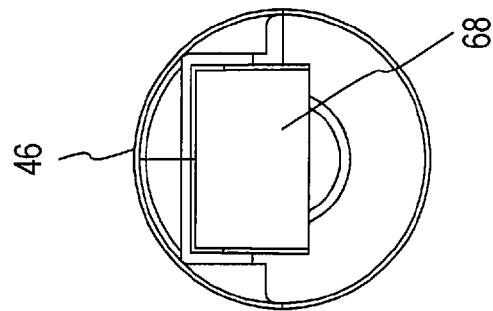

The valve 60 is thus closed as illustrated in FIGS. 4A and 4B, and the exhaust gases that have flowed inside the outer shell 20 pass through the holes H1 and H2 on the partition walls 28 and 30 to flow inside the second expansion chamber Sp2. The exhaust gases then flow inside the small-diameter pipe 42 from an opening at the exhaust-gas inlet end EE on the outlet pipe 40, circulate in the pipe main body 46, and are discharged to the outside of the automobile.

If the exhaust gases that have flowed into the pipe main body 46 from the small-diameter pipe 42 as described above hit a resisting part 68 of the valve 60, a lift force is caused by the flow of the exhaust gases, and a force towards the outside of the pipe main body 46 in the radial direction thereof (hereinafter referred to as exhaust-gas resisting force) is generated. This exhaust-gas resisting force is a force that becomes large as the flow amount of the exhaust gases increase, and is a force towards the direction to close the valve body 62.

On the other hand, if the amount of the exhaust gases that flow inside the outer shell 20 from the internal combustion engine 100 becomes large as the rotational frequency of the internal combustion engine 100 becomes high, the back pressure (i.e., pressure inside the first expansion chamber Sp1) increases. If this back pressure in the first expansion chamber Sp1 becomes larger than the combined force of a biasing force generated by the biasing member 72 and the exhaust-gas resisting force, the valve 60 is opened as illustrated in FIGS. 5A and 5B.

If the valve 60 is opened as described above, the exhaust gases that have flowed inside the outer shell 20 flow into the pipe main body 46 through the inlet port Vo on the pipe main body 46 to be discharged to the outside of the automobile.

[Effect of First Embodiment]

As described hereinbefore, the inlet port Vo and the valve 60 in the muffler 1 according to this embodiment can be disposed to various positions along the axial direction of the outlet pipe 40, without being limited to the open end-parts of the outlet pipe 40 inside the outer shell 20. Therefore, positions to dispose the inlet port Vo and the valve 60 can be freely (flexibly) selected according to the muffler 1.

Further according to the muffler 1, the outlet pipe 40 does not need to be provided with a diameter-expansion part for disposing the valve 60 thereto, unlike the known arts. Thus, according to the muffler 1, it is possible to prevent an increase in size of the structure of the outlet pipe 40 and consequently of the muffler 1.

Moreover, the valve 60 is configured to pivotally support the valve body 62 by forming the axis member 70 in almost the same length as the distance between the two concaves, 56 and 58, and supporting the axis member 70 at the concaves 56 and 58.

The valve 60 with the above structure can prevent component members of the valve 60 from protruding beyond the outside diameter of the outlet pipe 40, and can minimize increase in size of the structure of the outlet pipe 40 (and thus of the muffler) more definitely.

In the light of the above, structural restrictions of the muffler can be minimized according to the muffler 1.

Figure 6:
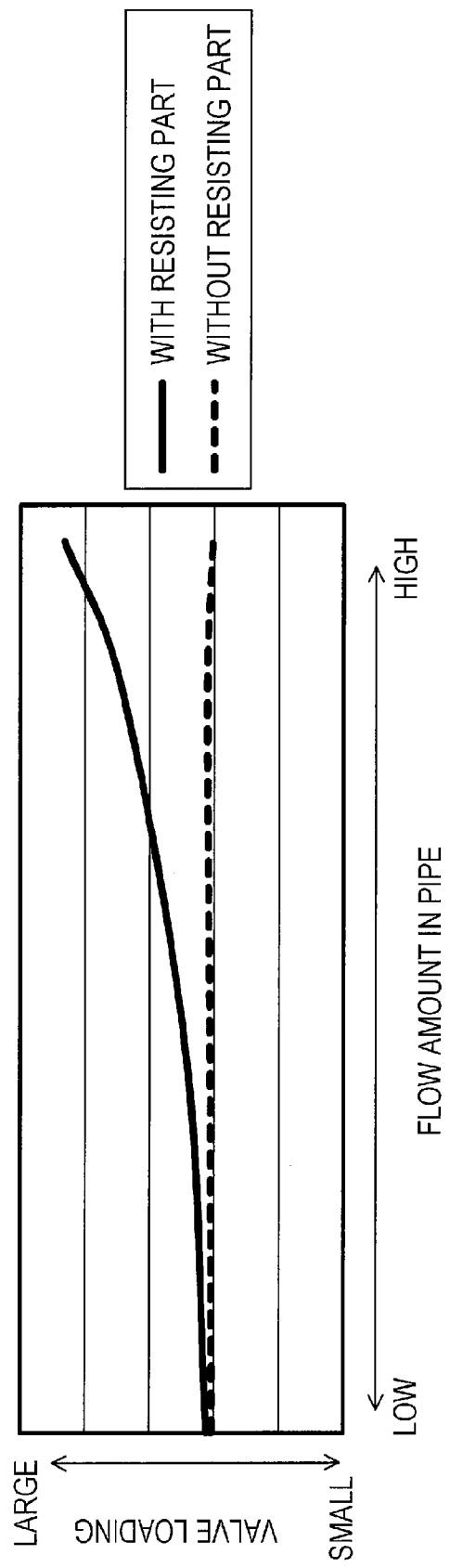
FIG. 6 is a graph illustrating a result of an experiment on the valve according to First Embodiment.
Figure 7:
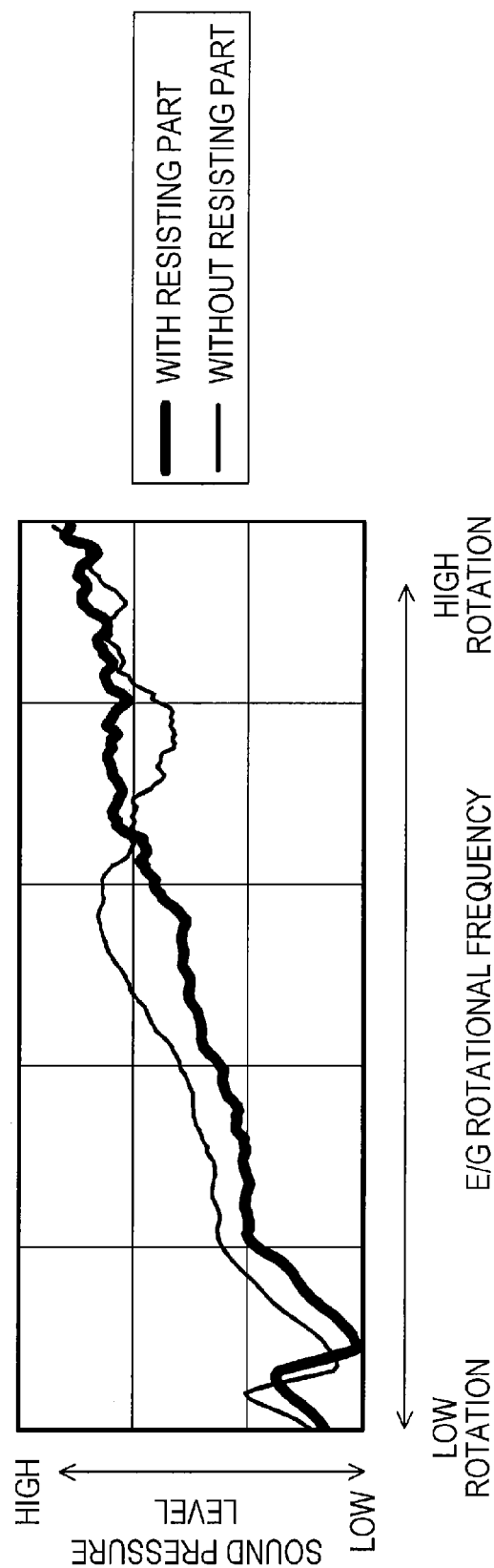
FIG. 7 is a graph illustrating a result of an experiment on the muffler according to First Embodiment.

FIG. 6 is a diagram to illustrate a relationship between flow amounts of the exhaust gases that circulate inside the pipe main body 46 (in the diagram: Flow Amount in Pipe) and required forces to open the valve body 62 (in the diagram: Valve Loading) when the valve 60 is closed. FIG. 7 is a diagram to illustrate a relationship between rotational frequencies of the internal combustion engine (in the diagram: E/G Rotational Frequency) and sound pressure levels in the muffler 1.

In the valve 60 according to this embodiment, the required force to open the valve body 62 becomes large as the flow amount of the exhaust gases that circulate inside the pipe main body 46 becomes large when the valve 60 is closed, as illustrated in FIG. 6.

Thus, the valve 60 according to this embodiment can remain closed not only when the operation status of the internal combustion engine 100 is in low rotation, but over a wide range of rotational frequency, and the flow path of the exhaust gases in the outlet pipe 40 can be elongated.

As a result, muffling effect can be improved not only when the operation status of the internal combustion engine 100 is in low rotation, but over a wide range of rotational frequency according to the muffler 1 as illustrated in FIG. 7.

Additionally, in the muffler 1, when the valve 60 is opened, the valve main body 64 moves further away from the inner surface of the outlet pipe 40 at the downstream side of the flow path of the exhaust gases. For this reason, when the valve 60 is opened, resistance of the valve body 62 against the exhaust gases that flow inside the outlet pipe 40 becomes small, allowing the exhaust gases to smoothly flow inside the pipe main body 46, according to the muffler 1.

In the muffler 1 according to this embodiment, a double torsion spring is used as the biasing member 72. Thus, it is possible to minimize a biasing force being applied to one area of the valve body 62 and consequently equalize the biasing force applied to each area of the valve body 62 according to the muffler 1.

[Second Embodiment]

A muffler in Second Embodiment is different from the muffler 1 in First Embodiment primarily as to the structure of the pipe main body, which is based mainly on a valve structure. Thus, structures of the pipe main body that are different from First Embodiment will be explained mainly in Second Embodiment; configurations as same as the muffler 1 in First Embodiment are marked with the identical reference numerals to omit explanations of those configurations.

<Pipe Main Body>

Figure 8:
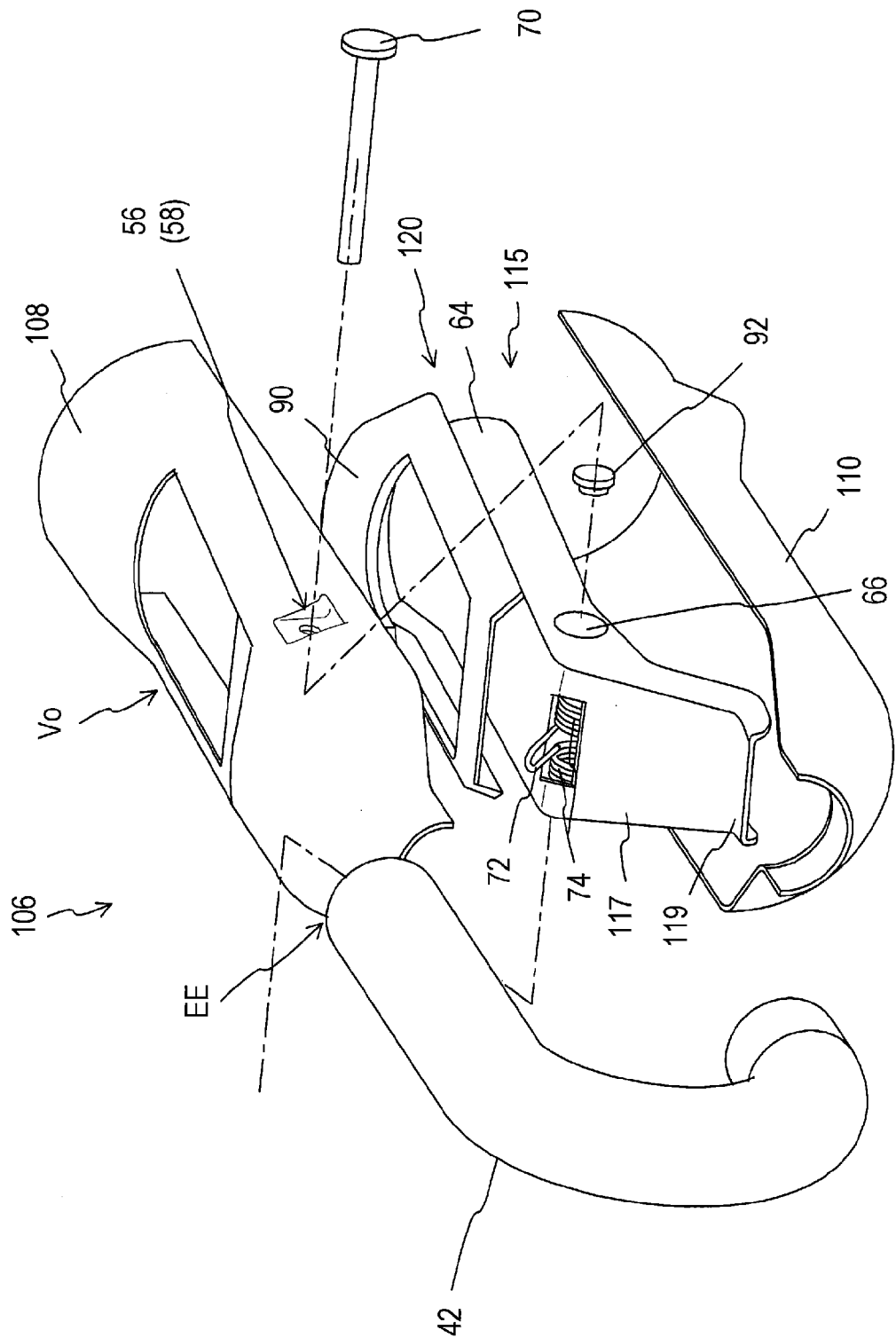
FIG. 8 is an exploded view illustrating an inside structure of a part of the outlet pipe according to Second Embodiment.

As illustrated in FIG. 8, a pipe main body 106 in Second Embodiment is a member formed into a cylindrical shape including a pair of open end-parts as a whole, and is provided with a first main body part 108 and a second main body part 110.

These first main body part 108 and second main body part 110 are semicircular-shape members, resembling a cylindrical pipe being cut along an axis that passes through its central line, likewise the first main body part 48 and the second main body part 50 in First Embodiment. The first main body part 108 and the second main body part 110 function as a cylindrically-shaped member by connecting them at the cut surfaces thereof.

The inlet port Vo in Second Embodiment is provided on a plane surface, which is formed on the first main body part 108 by denting. This plane surface, on which the inlet port Vo is formed, is formed to have a prescribed angle to the horizontal plane so as to be close to the axis center of the pipe main body 106 along the axis direction of the pipe main body 106.

The inlet port Vo is formed in a trapezoidal shape, an opening width of which increases along the axis direction of the pipe main body 106.

In addition, the pipe main body 106 is provided with two concaves, 56 and 58.

<Configuration of Valve>

A valve 115 in Second Embodiment is provided with a valve body 120, an axis member 70, a biasing member 72, a mesh 90, and a mesh bearing 92.

The valve body 120 is provided with a valve main body 64, a holding part 66, a resisting part 117, and an extension 119. The valve main body 64, the holding part 66, the resisting part 117, and the extension 119 are integrally formed.

The resisting part 117 is an elongated plate-like part, and protrudes from the valve main body 64. The protruding direction of this resisting part 117 from the valve main body 64 is a direction towards the upstream side of the flow path of the exhaust gases in the pipe main body 46. The resisting part 117 is connected to the valve main body 64 at more upstream of the flow path of the exhaust gases in the pipe main body 46 compared to the holding part 66. To be specific, an end part of the valve main body 64 at the upstream side in the flow path of the exhaust gases in the pipe main body 46 is connected to an end part of the resisting part 117.

The extension 119 is a plate-like member, and is extended from the resisting part 117. A position on the resisting part 117, from which the extension 119 is extended, is an end part, unconnected to the valve main body 64, of the resisting part 117; this end part of the resisting part 117 is on the opposite side of the end part, connected to the valve main body 64, of the resisting part 117. An end part, connected to the resisting part 117, of the extension 119 is hereinafter referred to as a valve body connecting-end 140 (see FIG. 9 and FIG. 10); an end part, opposite the valve body connecting-end 140, of the extension 119 is hereinafter referred to as non-connecting end 141 (see FIG. 9 and FIG. 10).

The protruding direction of the extension 119 from the resisting part 117 is a direction towards the upstream side of the flow path of the exhaust gases in the outlet pipe 40, so as to reduce the flow path of the exhaust gases in the outlet pipe 40. Additionally, the non-connecting end 141 of the extension 119 in Second Embodiment protrudes to be closer to the biasing member 72 (holding part 66) in the radial direction of the outlet pipe than at least the valve body connecting-end 140.

The mesh 90 is a reticulated member that is coupled to the surrounding edge of the inlet port Vo, which is formed on the first main body part 108.

The valve 115 is retained by the axis member 70 through the concave 56 (58), the mesh bearing 92, and the holding part 66.

<Function of Pipe Main Body>

Next is an explanation of the pipe main body 46.

The exhaust gases from the internal combustion engine 100 circulate in the inlet pipe 10, and flow inside the outer shell 20 from the through holes Ht and the opening at the outlet end OE on the inlet pipe 10. If the rotational frequency (number of rotation per unit time) of the internal combustion engine 100 is low, the flow amount of exhaust gases from the internal combustion engine 100 is small and thereby an increase of the back pressure (i.e., pressure inside the first expansion chamber Sp1) is small inside the outer shell 20.

Figure 9:
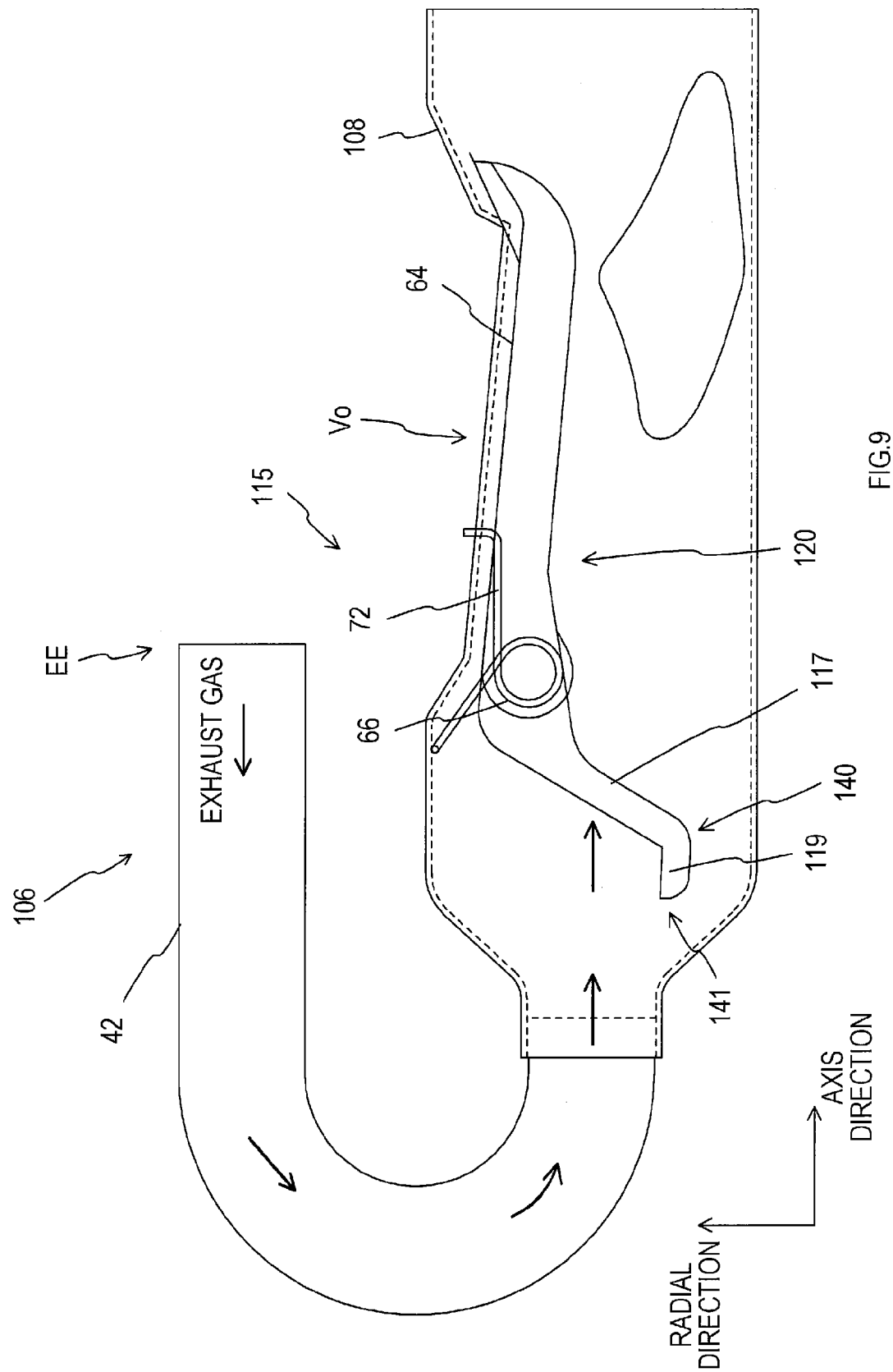
FIG. 9 is a diagram illustrating when a valve disposed to a pipe main body is closed according to Second Embodiment.

The valve 115 is thus closed as illustrated in FIG. 9, and the exhaust gases, which have flowed inside small-diameter pipe 42 from the opening at the exhaust-gas inlet end EE on the outlet pipe 40, circulate in the pipe main body 106 and are discharged to the outside of the automobile.

If the exhaust gases that have flowed into the pipe main body 106 from the small-diameter pipe 42 as described above hit a resisting part 117 (119) of the valve 115, a lift force is caused by the flow of the exhaust gases, and a force towards the outside of the pipe main body 106 in the radial direction of the pipe main body 106 (hereinafter referred to as exhaust-gas resisting force) is generated. This exhaust-gas resisting force is a force that becomes large as the flow amount of the exhaust gases increase, and is a force towards the direction to close the valve body 102.

Figure 10:
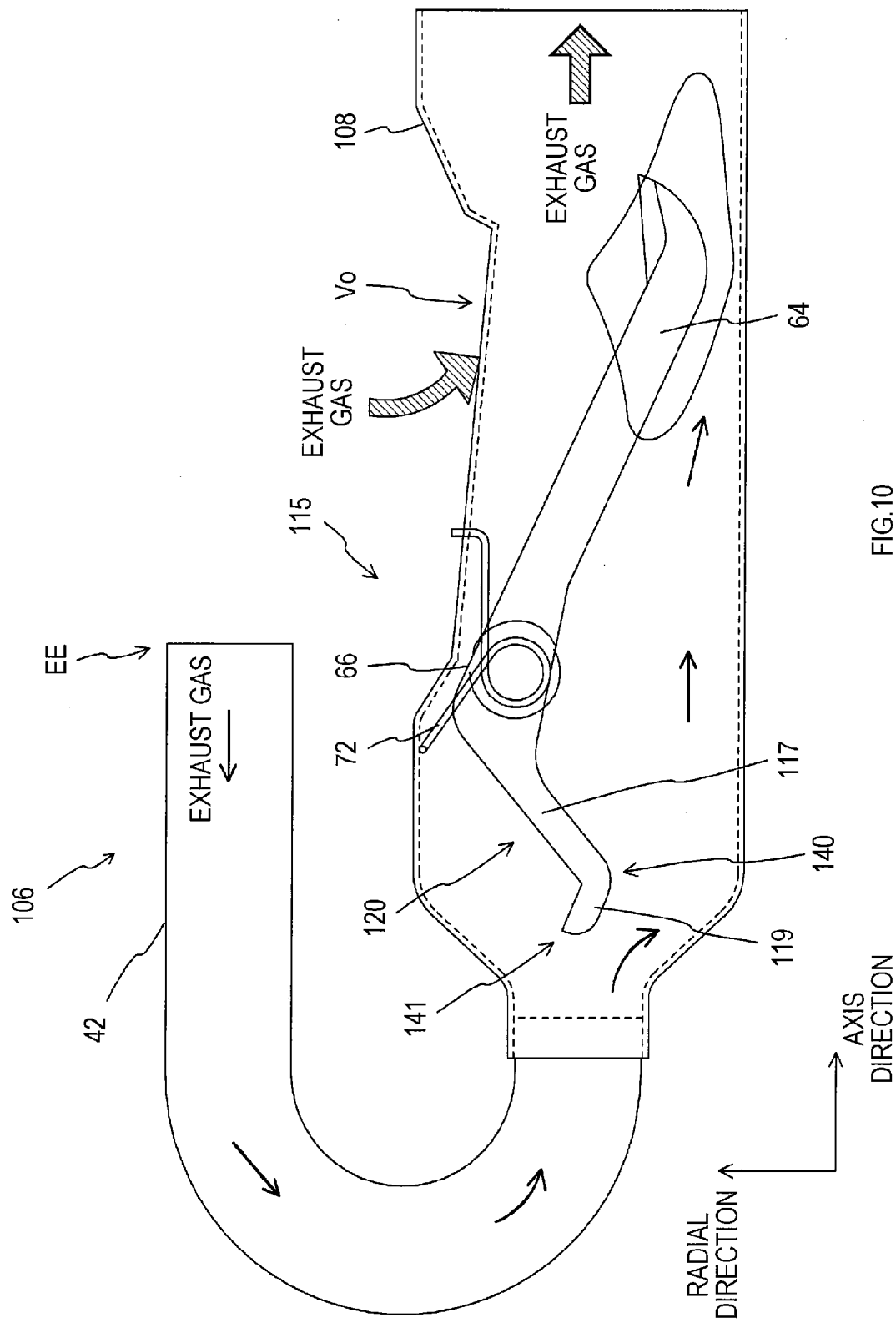
FIG. 10 is a diagram illustrating when the valve disposed to the pipe main body is closed according to Second Embodiment.

On the other hand, if the amount of the exhaust gases that flow inside the outer shell 20 from the internal combustion engine 100 becomes large as the rotational frequency of the internal combustion engine 100 becomes high, the back pressure (i.e., pressure inside the first expansion chamber Sp1) increases. If this back pressure in the first expansion chamber Sp1 becomes larger than the combined force of a biasing force generated by the biasing member 72 and the exhaust-gas resisting force, the valve 115 is opened as illustrated in FIG. 10.

If the valve 115 is opened as described above, the exhaust gases that have flowed inside the outer shell 20 flow into the pipe main body 106 through the inlet port Vo on the pipe main body 106 to be discharged to the outside of the automobile.

[Effect of Second Embodiment]

As described hereinbefore, the muffler according to Second Embodiment can achieve the same effect as the muffler 1 according to First Embodiment.

Further in the muffler according to Second Embodiment, the resisting part 117 is extended from a position more upstream of the flow path of the exhaust gases in the pipe main body 46 compared to the holding part 66. Thus, a large exhaust-gas resisting force is generated against the exhaust gases that circulate in the outlet pipe, in the muffler according to Second Embodiment. Consequently, the valve 115 can remain closed over a wide range of rotational frequency, in the muffler according to Second Embodiment.

Additionally in the muffler according to Second Embodiment, the extension 119 is extended from the resisting part 117 towards the upstream direction in the flow path of the exhaust gases in the outlet pipe 40 so as to reduce the flow path of the exhaust gases in the outlet pipe 40. Thus, it is possible to reduce the flow path of the exhaust gases in the outlet pipe 40, and to generate a large exhaust-gas resisting force against the exhaust gases that circulate in the outlet pipe 40, in the muffler according to Second Embodiment.

Moreover, the extension 119 is extended so that the non-connecting end 141 is disposed closer to the axis member 70 in the radial direction of the outlet pipe 40 than the valve body connecting-end 140 is. It is thus possible to secure a flow path of the exhaust gases between the outlet pipe 40 and the extension 119 when the back pressure is low, in the muffler according to Second Embodiment. Thereby, the flow path of the exhaust gases can be secured even if the back pressure is low, in the muffler according to Second Embodiment.

In the muffler according to Second Embodiment, the inlet port Vo is formed in a trapezoidal shape, an opening width of which increases along the axis direction of the pipe main body 106. It is thus possible to enlarge an opening area between the valve main body 64 and the first main body part 108 and to smoothly circulate the exhaust gases when the valve is opened, in the muffler according to Second Embodiment.

Since the valve main body 64, the holding part 66, the resisting part 117, and the extension 119 are integrally formed in the valve body 120 according to Second Embodiment, it is no longer required to assemble the resisting part 66 and such to the valve main body 64, and efficiency of performance can be improved.

Further in the muffler according to Second Embodiment, direct contact of the valve main body 64 to the first main body part 108 can be prevented when the valve 60 changed its status from opened to closed, because of the mesh 90 coupled to the surrounding edge of the inlet port Vo. It is thus possible to reduce undesired noise generated in the muffler according to Second Embodiment.

Incidentally, the resisting part 117 is connected to the valve main body 64 at more upstream of the flow path of the exhaust gases in the pipe main body 46 compared to the holding part 66, in the muffler according to Second Embodiment. In other words, the position of the biasing member 72 is at the rear of the resisting part 117 in the flow path of the exhaust gases.

Consequently, it is possible to reduce direct exposure of the biasing member 72 to the exhaust gases and to have the biasing member 72 last long, in the muffler according to Second Embodiment.

[Other Embodiments]

First Embodiment and Second Embodiment of the present invention are as explained hereinbefore; however, the present invention should not be limited to the aforementioned First Embodiment and Second Embodiment, and can be implemented in various modes within a scope of the substance of the present invention.

For example, although the outlet pipe 40 in the aforementioned embodiments is shaped into a cylindrical shape as a whole, a shape of the outlet pipe 40 does not have to be cylindrical as long as it is tubular.

Although the outlet end OE on the inlet pipe 10 is disposed to the third expansion chamber Sp3 in the aforementioned embodiments, the outlet end OE may also be disposed to the second expansion chamber Sp2 or to the first expansion chamber Sp1. Although the exhaust-gas inlet end EE on the outlet pipe 40 is disposed to the second expansion chamber Sp2 in the aforementioned embodiments, a position of the exhaust-gas inlet end EE does not have to be limited thereto, and may also be in the first expansion chamber Sp1 or in the third expansion chamber Sp3, for example.

Although the outlet pipe 40 is provided with the small-diameter pipe 42 in the aforementioned embodiments, a structure of the outlet pipe 40 does not have to be limited thereto, and may also be configured only with the pipe main body 46 without the small-diameter pipe 42.

Although the inlet port Vo of the outlet pipe 40 is disposed to the first expansion chamber Sp1 in the aforementioned embodiments, a position of the inlet port Vo does not have to be limited thereto; the inlet port Vo may also be disposed to any expansion chamber as long as the expansion chamber has the most increase in pressure when the operation status of the internal combustion engine 100 is in high rotation.

Although the outer shell 20 is divided into three expansion chambers in the aforementioned embodiments, a structure of the outer shell 20 does not have to be limited thereto; it may also be a divided structure with two expansion chambers, or with four or more expansion chambers, or may also be an undivided structure with one space.

Figure 11:
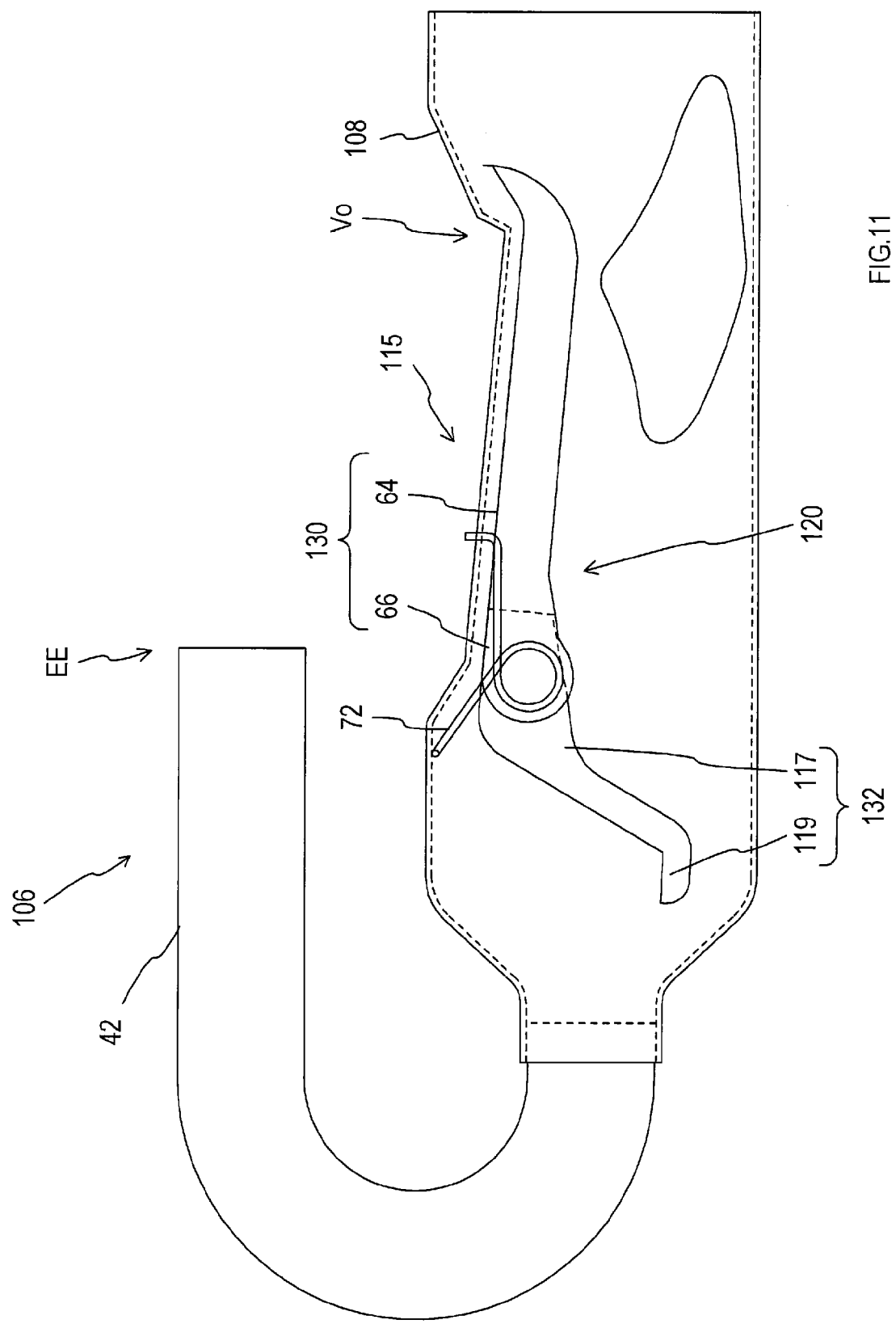
FIG. 11 is a diagram illustrating a variation of the valve according to Second Embodiment.

Although the valve main body 64, the holding part 66, the resisting part 117, and the extension 119 are integrally formed in the valve body 120 in the aforementioned embodiments, these parts do not have to be integrally formed. In other words, the valve body 120 may also be configured by connecting a member 130 and a member 132 as illustrated in FIG. 11; the valve main body 64 and the holding part 66 together form the member 130, and the resisting part 117 and the extension 119 together form the member 132.

Further in the valve body 120, the valve main body 64, the holding part 66, and the resisting part 117 may configure one member, and the extension 119 alone may configure one member.

The invention claimed is:

1. A muffler comprising;
   an outer shell configured to receive exhaust gases from an internal combustion engine;
   an outlet pipe that is formed into a tubular shape containing a pair of open end-parts, and comprises an inlet port that is an opening passing through an outer surface and an inner surface of the outlet pipe, wherein one open end-part of the pair of open end-parts and the inlet port are arranged inside the outer shell so as to discharge the exhaust gases from the outer shell to the outside;
   a valve body formed into a plate-like shape to cover the inlet port from the inside of the outlet pipe;
   an axis member that pivotally supports the valve body so that the valve body pivots inside the outlet pipe;
   a biasing member that applies a biasing force in a radial direction of the outlet pipe to the valve body so as to occlude the inlet port, wherein the biasing member comprises a double torsion spring; and
   a resisting part connected to the valve body to increase a force to close a valve by the exhaust gases that flow from one open end-part of the pair of open end-parts into the outlet pipe and to circulate therein.

2. The muffler according to claim 1, wherein the axis member pivotally supports the valve body at an end part of the inlet port on an upstream side of a flow path of the exhaust gases in the outlet pipe.

3. The muffler according to claim 1, wherein the resisting part is extended from the valve body towards an upstream direction of a flow path of the exhaust gases in the outlet pipe so as to resist the exhaust gases that circulate inside the outlet pipe.

4. The muffler according to claim 3,
   wherein the valve body is supported by the axis member at an end part of the inlet port on the upstream side of the flow path of the exhaust gases in the outlet pipe; and
   wherein the resisting part is extended from a section of the upstream side of the flow path of the exhaust gases in the outlet pipe arranged upstream of a section of the flow path where the valve body is supported by the axis member.

5. The muffler according to claim 4 comprising an extension extended from an end part, unconnected to the valve body, of the resisting part towards the upstream side of the flow path of the exhaust gases in the outlet pipe so as to reduce the flow path of the exhaust gases in the outlet pipe.

6. The muffler according to claim 5,
   wherein an end part, connected to the resisting part, of the extension is referred to as a valve body connecting-end, and an end-part opposite the valve body connecting-end, of the extension is referred to as a non-connecting end; and
   wherein the extension is extended so that the non-connecting end is closer to the axis member in the radial direction of the outlet pipe than the valve body connecting-end is.

7. The muffler according to claim 1, wherein the resisting part is integrally formed with the valve body.

8. The muffler according to claim 1, wherein the inlet port is formed into a shape with an opening width that increases along a flow path of the exhaust gases in the outlet pipe.

9. The muffler according to claim 1,
   wherein the outlet pipe comprises two concaves on each of two spots thereon facing each other across an axial direction of the outlet pipe, the two concaves being formed by denting the outer surface of the outlet pipe inward; and
   wherein end parts of the axis member disposed inside the outlet pipe are supported by the two concaves.

10. The muffler according to claim 1, further comprising a small-diameter pipe, which has a diameter smaller than a diameter of the outlet pipe and comprises the pair of open end-parts, wherein one open end-part of the pair of open end-parts is connected to the outlet pipe at a location upstream of the inlet port relative to the flow path of the exhaust gases in the outlet pipe.

11. The muffler according to claim 10,
    wherein the outer shell comprises a partition wall to form multiple spaces for the exhaust gases from the internal combustion engine to flow in; and
    wherein, in the small-diameter pipe, an other end-part, unconnected to the outlet pipe, of the pair of open end-parts is located at a space different from a space where the inlet port is located inside the outer shell.

12. The muffler according to claim 1, wherein the outlet pipe comprises a rounded radial cross-section with respect to an axial direction of the outlet pipe.

13. The muffler according to claim 1 comprising an inlet pipe that lets the exhaust gases flow from the internal combustion engine into the outer shell.

14. A muffler comprising;
    an outer shell configured to receive exhaust gases from an internal combustion engine;
    an outlet pipe that is formed into a tubular shape containing a pair of open end-parts, and comprises an inlet port that is an opening passing through an outer surface and an inner surface of the outlet pipe, wherein one open end-part of the pair of open end-parts and the inlet port are arranged inside the outer shell so as to discharge the exhaust gases from the outer shell to the outside;
    a valve body formed into a plate-like shape to cover the inlet port from the inside of the outlet pipe;
    an axis member that pivotally supports the valve body so that the valve body pivots inside the outlet pipe;
    a biasing member that applies a biasing force in a radial direction of the outlet pipe to the valve body so as to occlude the inlet port; and
    a resisting part connected to the valve body to increase a force to close a valve by the exhaust gases that flow from one open end-part of the pair of open end-parts into the outlet pipe and to circulate therein;

wherein the resisting part is extended from the valve body towards an upstream direction of a flow path of the exhaust gases in the outlet pipe so as to resist the exhaust gases that circulate inside the outlet pipe;

wherein the valve body is supported by the axis member at an end part of the inlet port on the upstream side of the flow path of the exhaust gases in the outlet pipe; and wherein the resisting part is extended from a section of the upstream side of the flow path of the exhaust gases in the outlet pipe arranged upstream of a section of the flow path where the valve body is supported by the axis member.

15. The muffler according to claim 14 comprising an extension extended from an end part, unconnected to the valve body, of the resisting part towards the upstream side of the flow path of the exhaust gases in the outlet pipe so as to reduce the flow path of the exhaust gases in the outlet pipe.

16. The muffler according to claim 15, wherein an end part, connected to the resisting part, of the extension is referred to as a valve body connecting-end, and an end-part opposite the valve body connecting-end, of the extension is referred to as a non-connecting end; and wherein the extension is extended so that the non-connecting end is closer to the axis member in the radial direction of the outlet pipe than the valve body connecting-end is.

17. A muffler comprising;

an outer shell configured to receive exhaust gases from an internal combustion engine;

an outlet pipe that is formed into a tubular shape containing a pair of open end-parts, and comprises an inlet port that is an opening passing through an outer surface and an inner surface of the outlet pipe, wherein one open end-part of the pair of open end-parts and the inlet port are arranged inside the outer shell so as to discharge the exhaust gases from the outer shell to the outside;

a valve body formed into a plate-like shape to cover the inlet port from the inside of the outlet pipe;

an axis member that pivotally supports the valve body so that the valve body pivots inside the outlet pipe;

a biasing member that applies a biasing force in a radial direction of the outlet pipe to the valve body so as to occlude the inlet port; and a resisting part connected to the valve body to increase a force to close a valve by the exhaust gases that flow from one open end-part of the pair of open end-parts into the outlet pipe and to circulate therein;

wherein the outlet pipe comprises two concaves on each of two spots thereon facing each other across an axial direction of the outlet pipe, the two concaves being formed by denting the outer surface of the outlet pipe inward; and wherein end parts of the axis member disposed inside the outlet pipe are supported by the two concaves.

* * * * *